(12) United States Patent
Chiu et al.

(10) Patent No.: US 10,941,294 B2
(45) Date of Patent: Mar. 9, 2021

(54) RESIN COMPOSITION

(71) Applicants: INDUSTRIAL TECHNOLOGY RESEARCH INSTITUTE, Hsinchu (TW); MICROCOSM TECHNOLOGY CO., LTD, Tainan (TW)

(72) Inventors: Chiu-Yen Chiu, Hsinchu (TW); Jui-Hsiang Tang, Taipei (TW); Shi-Ing Huang, Zhunan Township (TW)

(73) Assignees: INDUSTRIAL TECHNOLOGY RESEARCH INSTITUTE, Hsinchu (TW); MICROCOSM TECHNOLOGY CO., LTD, Tainan (TW)

(*) Notice: Subject to any disclaimer, the term of this patent is extended or adjusted under 35 U.S.C. 154(b) by 77 days.

(21) Appl. No.: 16/210,353

(22) Filed: Dec. 5, 2018

(65) Prior Publication Data
US 2019/0169434 A1 Jun. 6, 2019

Related U.S. Application Data

(60) Provisional application No. 62/594,693, filed on Dec. 5, 2017.

(51) Int. Cl.
| | | |
|---|---|---|
| *C08L 79/08* | (2006.01) | |
| *C08L 27/18* | (2006.01) | |
| *C08F 236/10* | (2006.01) | |
| *C08K 5/5419* | (2006.01) | |
| *C08F 36/06* | (2006.01) | |
| *C08G 73/10* | (2006.01) | |
| *C08F 36/08* | (2006.01) | |
| *C08L 21/00* | (2006.01) | |
| *C08K 3/36* | (2006.01) | |

(52) U.S. Cl.
CPC .............. *C08L 79/08* (2013.01); *C08F 36/06* (2013.01); *C08F 36/08* (2013.01); *C08F 236/10* (2013.01); *C08G 73/1042* (2013.01); *C08K 5/5419* (2013.01); *C08L 21/00* (2013.01); *C08L 27/18* (2013.01); *C08K 3/36* (2013.01)

(58) Field of Classification Search
None
See application file for complete search history.

(56) References Cited

U.S. PATENT DOCUMENTS

| | | | |
|---|---|---|---|
| 4,772,509 A | 9/1988 | Komada et al. | |
| 6,420,464 B1* | 7/2002 | Kuboki | C07D 307/42 524/109 |
| 6,887,525 B2 | 5/2005 | Kobayashi et al. | |
| 7,026,032 B2 | 4/2006 | Lee et al. | |
| 7,663,064 B2 | 2/2010 | Dutta et al. | |
| 7,755,445 B2 | 7/2010 | Dutta et al. | |
| 8,475,924 B2 | 7/2013 | Lee et al. | |
| 9,688,886 B2 | 6/2017 | Ring et al. | |
| 2005/0096429 A1 | 5/2005 | Lee et al. | |
| 2007/0088134 A1 | 4/2007 | Suzuki et al. | |
| 2007/0207186 A1* | 9/2007 | Scanlon | A61F 2/91 424/424 |
| 2008/0200636 A1* | 8/2008 | Nakanishi | C08L 63/00 528/105 |
| 2014/0318698 A1 | 10/2014 | Baars et al. | |
| 2016/0177062 A1* | 6/2016 | Sato | C08J 5/18 524/127 |
| 2017/0009017 A1* | 1/2017 | Huang | C08G 73/1046 |
| 2017/0064838 A1 | 3/2017 | Wu et al. | |
| 2017/0120561 A1 | 5/2017 | Huang et al. | |
| 2019/0169434 A1* | 6/2019 | Chiu | C08L 21/00 |

FOREIGN PATENT DOCUMENTS

| | | |
|---|---|---|
| CN | 1803923 A | 7/2006 |
| CN | 102850726 A | 1/2013 |
| CN | 103270070 B | 2/2015 |
| CN | 104918406 A | 9/2015 |
| CN | 106062049 A | 10/2016 |
| EP | 0442145 A2 | 8/1991 |
| JP | 4016226 B2 | 12/2007 |
| JP | 6110449 B2 | 4/2017 |
| KR | 10-1027303 B1 | 4/2005 |
| TW | 200827386 A | 7/2008 |
| TW | 201518409 A | 5/2015 |
| TW | 201605951 A | 2/2016 |
| TW | 201702312 A | 1/2017 |

(Continued)

OTHER PUBLICATIONS

Taiwanese Office Action for Appl. No. 107143611 dated Nov. 7, 2019.
Halim et al.,"Synthesis and self-assembly of polyimide/poly(dimethylsiloxane) brush triblock copolymers", Polymer, vol. 54, 2013 (published online Dec. 17, 2012), pp. 520-529 (10 pages).
Köytepe et al., "Synthesis of nickelocene containing polyimides with low-dielectric constants," Journal of Alloys and Compounds, vol. 470, 2009 (published online Apr. 8, 2008), pp. 347-353 (7 pages).
Qi et al., "Morphology and structure of polymer fluorocarbon coatings on polyimide by sputtering," Surface & Coatings Technology, vol. 201, 2007 (published online Nov. 7, 2006), pp. 5522-5525 (4 pages).

(Continued)

*Primary Examiner* — Peter A Salamon
(74) *Attorney, Agent, or Firm* — Birch, Stewart, Kolasch & Birch, LLP

(57) ABSTRACT

A resin composition is provided. The resin composition includes a polyimide resin; a hydrocarbon resin or a fluorinated polymer resin; and a silica that is modified by a surface modifier. The content of the hydrocarbon resin is in a range from 1 to 13 parts by weight based on 100 parts by weight of the polyimide resin. The content of the fluorinated polymer resin is in a range from 1 to 60 parts by weight based on 100 parts by weight of the polyimide resin. The content of the silica is in a range from 1 to 10 parts by weight based on 100 parts by weight of the polyimide resin.

6 Claims, No Drawings

(56) References Cited

FOREIGN PATENT DOCUMENTS

| | | |
|---|---|---|
| TW | I591100 B | 7/2017 |
| TW | I593753 B | 8/2017 |
| WO | WO 2016/159102 A1 | 10/2016 |

OTHER PUBLICATIONS

Velioğlu et al., "Propylene/propane plasticization in polyimide membranes", Journal of Membrane Science, vol. 501, 2016 (published online Dec. 2, 2015), pp. 179-190 (12 pages).

Wang et al., "Sulfonated polyimide/PTFE reinforced membrane for PEMFCs," Journal of Power Sources, vol. 167, 2007 (published online Feb. 12, 2007), pp. 47-52 (6 pages).

\* cited by examiner

RESIN COMPOSITION

CROSS REFERENCE TO RELATED APPLICATIONS

This application claims priority of provisional U.S. Application No. 62/594,693, filed on Dec. 5, 2017, the entirety of which is incorporated by reference herein.

TECHNICAL FIELD

The present disclosure relates to a resin composition, and in particular it relates to a polyimide (PI) resin composition.

BACKGROUND

As the information society develops rapidly, demands on the quality and speed of information transmission are becoming more and more restrictive. High-frequency and high-speed signal transmission is the current developmental trend, and the development of materials used in high-frequency communication is also gradually gaining attention. For example, substrate materials for devices that are equipped with signal transmission function (e.g., mobile phones, routers, servers, computers, etc.) are being improved to have low signal transmission loss so that the substrate can be made suitable for the transmission of high-frequency signals.

The dielectric constant (Dk) and the dielectric loss factor (Df) of materials are important indicators that affect the speed and quality of signal transmission. Substrate materials having a low dielectric constant and a low dielectric loss factor can prevent the signal loss of transmission. The speed of high-frequency transmission and the integrity of the signal can also be maintained.

Polyimide resins possess good stability, heat resistance, coefficient of thermal expansion, mechanical strength, electrical resistance, and so on, and they are commonly used in the fabrication of flexible substrates (e.g., printed circuit boards (PCBs)). However, the dielectric loss factor of the polyimide resin is increased drastically in high-frequency environments, and the speed and quality of signal transmission in the device will be affected.

As described above, although existing materials used in communication devices have been adequate for their intended purposes, they have not been entirely satisfactory in all respects. In order to comply with the demands for high-frequency and high-speed signal transmission, the materials that can maintain a low loss of signal transmission in a high-frequency environment are expected in the industry.

SUMMARY

In accordance with some embodiments of the present disclosure, a resin composition is provided. The resin composition comprises a polyimide resin; a hydrocarbon resin; and a silica that is modified by a surface modifier. The content of the hydrocarbon resin is in a range from 1 to 13 parts by weight based on 100 parts by weight of the polyimide resin, and the content of the silica is in a range from 1 to 10 parts by weight based on 100 parts by weight of the polyimide resin.

In accordance with some embodiments of the present disclosure, a resin composition is provided. The resin composition comprises a polyimide resin; a fluorinated polymer resin; and a silica that is modified by a surface modifier. The content of the fluorinated polymer resin is in a range from 1 to 60 parts by weight based on 100 parts by weight of the polyimide resin, and the content of the silica is in a range from 1 to 10 parts by weight based on 100 parts by weight of the polyimide resin.

DETAILED DESCRIPTION

The resin composition and the method for manufacturing the resin composition provided by the present disclosure are described in detail in the following description. In the following description, for purposes of explanation, numerous specific details and examples or embodiments are set forth in order to provide a thorough understanding of the present disclosure. It will be apparent, however, that the exemplary embodiments set forth herein are used merely for the purpose of illustration, and the concept of the present disclosure may be embodied in various forms without being limited to those exemplary embodiments.

Unless defined otherwise, all technical and scientific terms used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined.

In accordance with some embodiments of the present disclosure, the resin composition is provided. The resin composition includes polyimide resin and fluorinated polymer resin or hydrocarbon resin. The fluorinated polymer resin and the hydrocarbon resin are added so that the resin composition can still maintain good dielectric properties in a high-frequency environment and the loss of signal transmission can be effectively decreased. Therefore, when the elements made of such resin composition (for example, a substrate, a printed circuit board, or the like) are applied to a signal transmission device, the rate of high-frequency transmission and the integrity of the transmission signal of the device can be effectively improved.

In addition, based on the specific component and ratio of the resin composition, the dielectric loss factor of the cured resin composition may be maintained below 0.007 in a high-frequency environment in accordance with some embodiments of the present disclosure. The cured resin composition may also possess low water absorption rate (e.g., less than 1%) and low coefficient of thermal expansion (CTE).

In accordance with some embodiments of the present disclosure, the resin composition includes a polyimide resin, a hydrocarbon resin and a silica that is modified by a surface modifier (i.e. surface modified silica). In accordance with some embodiments of the present disclosure, the content of the hydrocarbon resin is in a range from about 1 to about 13 parts by weight based on 100 parts by weight of the polyimide resin. In accordance with some embodiments of the present disclosure, the content of the silica (silicon dioxide) that is modified by the surface modifier is in a range from about 1 to about 10 parts by weight based on 100 parts by weight of the polyimide resin. For example, in accordance with some embodiments of the present disclosure, based on 100 parts by weight of the polyimide resin, the content of the silica that is modified by the surface modifier is in a range from about 2 to about 7 parts by weight, or from about 3 to about 6 parts by weight.

In accordance with some embodiments of the present disclosure, the polyimide resin is obtained by copolymerizing the following components (a) at least two dianhydride monomers and (b) at least two diamine monomers. In accordance with some embodiments of the present disclosure, one of the (a) at least two dianhydride monomers is p-phenylenebis(trimellitate anhydride) and its content accounts for about 80% to about 95% of the total moles of the dianhydride monomers. In addition, the other (or another) dianhydride monomers of the (a) at least two dianhydride monomers (i.e. the dianhydride monomers other than p-phenylenebis(trimellitate anhydride)) are selected from a group consisting of 4,4'-(hexafluoroisopropylidene)-diphthalic anhydride, and 4,4'-(4,4'-isopropyldiphenoxy)bis(phthalic anhydride). In accordance with some embodiments of the present disclosure, one of the (b) at least two diamine monomers is 2,2'-bis(trifluoromethyl)benzidine and its content accounts for about 70% to about 90% of total moles of the diamine monomers. In addition, the other (or another) diamine monomers of the (b) at least two diamine monomers (i.e. the diamine monomers other than 2,2'-bis(trifluoromethyl)benzidine) are selected from a group consisting of 4,4'-diaminodiphenyl ether, 4,4'-diaminodiphenylmethane, 2,2-bis[4-(4-aminophenoxy)phenyl]propane, 4,4'-diaminodiphenyl-sulfone, 1,3-bis(4-aminophenoxy)benzene, 4,4'-diaminobenzanilide, p-phenylenediamine, 4,4'-diamino-2,2'-dimethyl-1,1'-biphenyl, 2,2-bis[4-(4-aminophenoxy)phenyl]-1,1,1,3,3,3-hexafluoropropane, and 4,4'-diamino octafluorobiphenyl, 2,2-bis(3-amino-4-tolyl)hexafluoropropane, and 2,2-bis(3-amino-4-hydroxyphenyl)hexafluoropropane, and its content accounts for about 10% to about 30% of the total moles of the diamine monomers. Moreover, in accordance with some embodiments of the present disclosure, the ratio of total moles of dianhydride monomers to total moles of diamine monomers is in a range from about 0.85 to about 1.15.

In accordance with some embodiments of the present disclosure, the dianhydride monomers and/or the diamine monomers that are used to form the polyimide resin include the fluorine-containing monomer. In other words, the polyimide resin contains fluorine in accordance with some embodiments of the present disclosure. In accordance with some embodiments of the present disclosure, the dianhydride monomers that are used to form the polyimide resin includes 4,4'-(hexafluoroisopropylidene)bis-phthalic anhydride and its content account for not more than 15% (at most 15%) of the total moles of the dianhydride monomers. In accordance with some embodiments of the present disclosure, the diamine monomers that are used to form the polyimide resin includes 2,2-bis[4-(4-aminophenoxy)phenyl]-1,1,1,3,3,3-hexafluoropropane, 4,4'-diamino octafluorobiphenyl, 2,2-bis(3-amino-4-tolyl)hexafluoropropane, 2,2-bis(3-amino-4-hydroxyphenyl)hexafluoropropane, or a combination thereof, and its content account for about 10% to about 30% of the total moles of the diamine monomers. In addition, the polyimide resin may be thermoplastic resin in accordance with some embodiments of the present disclosure.

In accordance with some embodiments of the present disclosure, the hydrocarbon resin includes polybutadiene, polybutadiene-styrene mixture, polyisoprene, cyclic olefin copolymer, butadiene-styrene-divinylbenzene copolymer, or a combination thereof. In accordance with some embodiments of the present disclosure, the number-average molecular weight (Mn) of the hydrocarbon resin is in a range from about 1000 to about 9000, from about 1000 to about 5000, from about 1000 to about 3000, or from about 1000 to about 2000. As described above, the resin composition includes about 1 to about 13 parts by weight of the hydrocarbon resin (based on 100 parts by weight of the polyimide resin). In particular, the resin composition in which the hydrocarbon resin is added may maintain good dielectric properties in a high-frequency environment and may effectively reduce the loss of signal transmission.

In accordance with some embodiments of the present disclosure, the silica (silicon dioxide) may serve as filler to further control the coefficient of thermal expansion (CTE) of the resin composition. In accordance with some embodiments of the present disclosure, a volume mean diameter (a volume-based average particle size) of the silica is in a range from about 0.5 μm to about 25 μm. For example, in accordance with some embodiments of the present disclosure, the volume mean diameter of the silica is in a range from about 2 μm to about 15 μm, or from about 3 μm to about 11 μm. It should be noted that if the particle size of the silica is too large (e.g., larger than 25 μm), it may be difficult for the silica to disperse in the resin composition so that the difficulty of the mixing step may be increased; on the other hand, if the particle size of the silica is too small (e.g., smaller than 0.5 μm), then the resin composition may be easily broken after the cyclization process of the polyimide resin.

As described above, the silica may be modified by the surface modifier. The silica that has been modified by the surface modifier (i.e. surface modified silica) does not affect the dielectric loss factor of the resin composition. In accordance with some embodiments of the present disclosure, the content of the surface modifier that is used to modify the silica is in a range from about 0.1 to about 5 parts by weight based on 100 parts by weight of the silica. In accordance with some embodiments of the present disclosure, the surface modifier includes vinyltriethoxysilane, propyltrimethoxysilane, propyltriethoxysilane, isobutyltrimethoxysilane, isobutyltriethoxysilane, octyltrimethoxysilane, octyltriethoxysilane, octadecyltrimethoxysilane, octadecylethoxysilane, N-phenyl-3-aminopropyltrimethoxysilane, phenyltrimethoxysilane, phenyltriethoxysilane, 3-glycidoxypropyltrimethoxysilane, 3-glycidoxypropyltriethoxysilane, 3-aminopropyltrimethoxysilane, 3-aminopropyltriethoxysilane, aminoethyl aminopropyl trimethoxysilane, aminoethyl aminopropyl triethoxysilane, 3-isocyanatopropyltrimethoxysilane, 3-isocyanatopropyltriethoxysilane, or a combination thereof.

In accordance with some embodiments of the present disclosure, the dielectric loss factor of the cured product of the above resin composition is less than about 0.007 under high-frequency conditions. For example, the dielectric loss factor of the cured resin composition may be less than about 0.006, less than about 0.005, less than about 0.004, or less than about 0.003 in accordance with some embodiments. Moreover, in accordance with some embodiments of the present disclosure, the linear coefficient of thermal expansion the cured product of the above resin composition is in a range from about 15 to about 50 ppm/K, for example, from about 15 to about 35 ppm/K. In accordance with some embodiments of the present disclosure, the high-frequency section is in a range of greater than about 10 GHz, for example, greater than about 20 GHz, or greater than about 30 GHz.

Furthermore, in accordance with some embodiments of the present disclosure, the curing process of the resin composition can be carried out by applying a mixture of the resin composition onto a copper foil and heating. Specifically, the temperature of the curing process may be in a range from about 100° C. to about 200° C., for example, from about 120° C. to about 150° C. After the curing process of the resin composition, the cyclization process of the polyimide resin can be performed. In accordance with some embodiments of the present disclosure, the temperature of the cyclization process may be in a range from about 250° C. to about 450° C., for example, from about 350° C. to about 400° C.

In accordance with some other embodiments of the present disclosure, a resin composition is provided. The resin composition includes a polyimide resin, a fluorinated polymer resin and a silica that is modified by a surface modifier. In accordance with some embodiments of the present disclosure, the content of the fluorinated polymer resin is in a range from about 1 to about 60 parts by weight based on 100 parts by weight of the polyimide resin. For example, in accordance with some embodiments of the present disclosure, based on 100 parts by weight of the polyimide resin, the content of the fluorinated polymer resin is in a range from about 5 to about 50 parts by weight, from about 10 to about 40 parts by weight, or from about 30 to about 40 parts by weight. In accordance with some embodiments of the present disclosure, the content of the silica that is modified by surface modifier is in a range from about 1 to about 10 parts by weight based on 100 parts by weight of the polyimide resin. For example, in accordance with some embodiments of the present disclosure, based on 100 parts by weight of the polyimide resin, the content of the silica that is modified by the surface modifier is in a range from about 2 to about 7 parts by weight, or from about 3 to about 5 parts by weight.

In accordance with some embodiments of the present disclosure, the polyimide resin is obtained by copolymerizing the following components (a) at least two dianhydride monomers and (b) at least two diamine monomers. In accordance with some embodiments of the present disclosure, one of the (a) at least two dianhydride monomers is p-phenylenebis(trimellitate anhydride) and its content accounts for about 80% to about 95% of the total moles of the dianhydride monomers. In addition, the other (or another) dianhydride monomers of the (a) at least two dianhydride monomers (i.e. the dianhydride monomers other than p-phenylenebis(trimellitate anhydride)) are selected from a group consisting of 4,4'-(hexafluoroisopropylidene)-diphthalic anhydride, and 4,4'-(4,4'-isopropyldiphenoxy)bis(phthalic anhydride). In accordance with some embodiments of the present disclosure, one of the (b) at least two diamine monomers is 2,2'-bis(trifluoromethyl)benzidine and its content accounts for about 70% to about 90% of total moles of the diamine monomers. In addition, the other (or another) diamine monomers of the (b) at least two diamine monomers (i.e. the diamine monomers other than 2,2'-bis(trifluoromethyl)benzidine) are selected from a group consisting of 4,4'-diaminodiphenyl ether, 4,4'-diaminodiphenyl-methane, 2,2-bis[4-(4-aminophenoxy)phenyl]propane, 4,4'-diaminodiphenyl-sulfone, 1,3-bis(4-aminophenoxy)benzene, 4,4'-diaminobenzanilide, p-phenylenediamine, 4,4'-diamino-2,2'-dimethyl-1,1'-biphenyl, 2,2-bis[4-(4-aminophenoxy)phenyl]-1,1,1,3,3,3-hexafluoropropane, and 4,4'-diamino octafluorobiphenyl, 2,2-bis(3-amino-4-tolyl)hexafluoropropane, and 2,2-bis(3-amino-4-hydroxyphenyl)hexafluoropropane, and its content accounts for about 10% to about 30% of the total moles of the diamine monomers. Moreover, in accordance with some embodiments of the present disclosure, the ratio of the total moles of dianhydride monomers to the total moles of diamine monomers is in a range from about 0.85 to about 1.15.

In accordance with some embodiments of the present disclosure, the dianhydride monomers and/or the diamine monomers that are used to form the polyimide resin include the fluorine-containing monomer. In other words, the polyimide resin contains fluorine in accordance with some embodiments of the present disclosure. In accordance with some embodiments of the present disclosure, the dianhydride monomers that are used to form the polyimide resin includes 4,4'-(hexafluoroisopropylidene)bis-phthalic anhydride and its content accounts for not more than 15% of the total moles of the dianhydride monomers. In accordance with some embodiments of the present disclosure, the diamine monomers that are used to form the polyimide resin includes 2,2-bis[4-(4-aminophenoxy)phenyl]-1,1,1,3,3,3-hexafluoropropane, 4,4'-diamino octafluorobiphenyl, 2,2-bis(3-amino-4-tolyl)hexafluoropropane, 2,2-bis(3-amino-4-hydroxyphenyl)hexafluoropropane, or a combination thereof, and its content accounts for about 10% to about 30% of the total moles of the diamine monomers. In accordance with some embodiments of the present disclosure, the fluorinated polymer resin includes polytetrafluoroethylene (PTFE), fluorinated ethylene propylene (FEP), soluble polytetrafluoroethylene (perfluoroalkoxy alkane, PFA), copolymer of tetrafluoroethylene and perfluoromethyl-vinylether (MFA), or a combination thereof.

In accordance with some embodiments of the present disclosure, the volume mean diameter of the fluorinated polymer resin is less than about 20 μm. For example, in accordance with some embodiments of the present disclosure, the volume mean diameter of the fluorinated polymer resin is in a range from about 2 μm to about 20 μm, from about 3 μm to about 10 μm, or from about 3 μm to about 5 μm. As described above, in accordance with some embodiments of the present disclosure, the resin composition includes about 1 to about 60 parts by weight of the fluorinated polymer resin (based on 100 parts by weight of the polyimide resin). In particular, the resin composition in which the fluorinated polymer resin is added may maintain good dielectric properties in a high-frequency environment and may effectively reduce the loss of signal transmission.

In accordance with some embodiments of the present disclosure, the silica (silicon dioxide) may serve as filler to further control the coefficient of thermal expansion (CTE) of the resin composition. In accordance with some embodiments of the present disclosure, a volume mean diameter of the silica is in a range from about 0.5 μm to about 25 μm. For example, in accordance with some embodiments of the present disclosure, the volume mean diameter of the silica is in a range from about 2 μm to about 15 μm, or from about 3 μm to about 11 μm. It should be noted that if the particle size of the silica is too large (e.g., larger than 25 μm), it may be difficult for the silica to disperse in the resin composition so that the difficulty of the mixing step may be increased; on the other hand, if the particle size of the silica is too small (e.g., smaller than 0.5 μm), then the resin composition may be easily broken after the cyclization process of the polyimide resin. In addition, in accordance with some embodiments of the present disclosure, the ratio of the particle size of the fluorinated polymer resin to the silica is in a range from about 0.1 to about 40. For example, the ratio of the particle size of the fluorinated polymer resin to the silica may be in a range from about 0.1 to about 20, or from about 0.2 to about 2.

As described above, the silica may be modified by the surface modifier. The silica that has been modified by the surface modifier (i.e. surface modified silica) does not affect the dielectric loss factor of the resin composition. In accordance with some embodiments of the present disclosure, the content of the surface modifier that is used to modify the silica is in a range from about 0.1 to about 5 parts by weight based on 100 parts by weight of the silica. In accordance with some embodiments of the present disclosure, the surface modifier includes vinyltriethoxysilane, propyltrimethoxysilane, propyltriethoxysilane, isobutyltrimethoxysilane, isobutyltriethoxysilane, octyltrimethoxysilane, octyltriethoxysilane, octadecyltrimethoxysilane, octadecylethoxysilane, N-phenyl-3-aminopropyltrimethoxysilane, phenyltrimethoxysilane, phenyltriethoxysilane, 3-glycidoxypropyltrimethoxysilane, 3-glycidoxypropyltriethoxysilane, 3-aminopropyltrimethoxysilane, 3-aminopropyltriethoxysilane, aminoethyl aminopropyl trimethoxysilane, aminoethyl aminopropyl triethoxysilane, 3-isocyanatopropyltrimethoxysilane, 3-isocyanatopropyltriethoxysilane, or a combination thereof.

In accordance with some embodiments of the present disclosure, the dielectric loss factor of the cured product of the above resin composition is less than about 0.007 under high-frequency (larger than 10 GHz, e.g., larger than 20 GHz or larger than 30 GHz) conditions. For example, the dielectric loss factor of the cured resin composition may be less than about 0.006, less than about 0.005, less than about 0.004, or less than about 0.003 in accordance with some embodiments. Moreover, in accordance with some embodiments of the present disclosure, the linear coefficient of thermal expansion the cured product of the above resin composition is in a range from about 15 to about 50 ppm/K.

A detailed description is given in the following particular embodiments in order to provide a thorough understanding of the present disclosure. However, the scope of the present disclosure is not intended to be limited to the particular embodiments. Furthermore, in the examples and comparative examples, the measurement methods regarding the various properties of the resin composition are also explained as follows.

Example 1: Resin Composition A1

(1) Surface Modification of Silica (SiO$_2$)

20 g of SiO$_2$ (the volume mean diameter is 2-3 μm) and 0.2 g of vinyltriethoxysilane (which was bought from Shin-Etsu, catalogue number KBE-1003) were dispersed in 10 g of water (pH=3.5), and were stirred for 20 minutes and dried at 120° C.

(2) Preparation of Polyimide Resin Solution (Precursor of Polyimide Resin)

24.20 g (0.076 moles) of 2,2'-bis(trifluoromethyl)benzidine (TFMB), 1.85 g (0.017 moles) of p-phenylenediamine (PDA), 2.36 g (0.008 moles) of 1,3-bis(4-aminophenoxy) benzene (TPE-R) and 244.37 g of N-methyl-2-pyrrolidone (NMP) were placed in a three-necked bottle. After complete dissolution with stirring at 30° C., 41.75 g (0.091 moles) of p-phenylenebis(trimellitate anhydride) (TAHQ) and 2.83 g (0.005 moles) of 4,4'-(4,4'-isopropyldiphenoxy)bis(phthalic anhydride) (PBADA) were added to the above mixture. Then, the mixture was stirred continuously and reacted at 25° C. for 24 hours to obtain the polyimide resin solution.

(3) Preparation of Mixture of Resin Composition A1

25 g of butanone was added to 10 g of polybutadiene (the number-average molecular weight=1500) (which was bought from Polysciences, Inc., catalogue number 22395) and 2.2 g of tetramethyltetravinylcyclotetrasiloxane (which was bought from Alfa Aesar, catalogue number T22A066) to form a mixture of polybutadiene resin. Then, 6.5 g of the above mixture of polybutadiene resin was added to 50 g of the above polyimide resin solution and 2.5 g of the above surface modified SiO$_2$ to form a mixture of resin composition A1.

(4) Preparation of Cured Product of Resin Composition A1

A three-wheel roller (400 rpm) was used to uniformly disperse the above mixture of resin composition A1, and then the mixture was subjected to a vacuum defoaming process. Then, the mixture of resin composition A1 was coated on a copper foil and dried at 140° C. for 6 minutes to carry out the curing process. Then, the mixture of resin composition A1 was heated at 380° C. for 10 minutes to carry out a cyclization (imidation) process. Then, the copper foil was removed to obtain a cured film of the resin composition A1, and the thickness of the cured film was measured.

Example 2: Resin Composition A2

(1) Surface Modification of Silica (SiO$_2$)

20 g of SiO$_2$ (the volume mean diameter is 2-3 μm) and 0.2 g of vinyltriethoxysilane (which was bought from Shin-Etsu, catalogue number KBE-1003) were dispersed in 10 g of water (pH=3.5), and were stirred for 20 minutes and dried at 120° C.

(2) Preparation of Polyimide Resin Solution (Precursor of Polyimide Resin)

24.20 g (0.076 moles) of 2,2'-bis(trifluoromethyl)benzidine (TFMB), 1.85 g (0.017 moles) of p-phenylenediamine (PDA), 2.36 g (0.008 moles) of 1,3-bis(4-aminophenoxy) benzene (TPE-R) and 244.37 g of N-methyl-2-pyrrolidone (NMP) were placed in a three-necked bottle. After complete dissolution with stirring at 30° C., 41.75 g (0.091 moles) of p-phenylenebis(trimellitate anhydride) (TAHQ) and 2.83 g (0.005 moles) of 4,4'-(4,4'-isopropyldiphenoxy)bis(phthalic anhydride) (PBADA) were added to the above mixture. Then, the mixture was stirred continuously and reacted at 25° C. for 24 hours to obtain the polyimide resin solution.

(3) Preparation of Mixture of Resin Composition A2

25 g of butanone was added to 10 g of polybutadiene (the number-average molecular weight=3000) (which was bought from Polysciences, Inc., catalogue number 06081) and 2.2 g of tetramethyltetravinylcyclotetrasiloxane (which was bought from Alfa Aesar, catalogue number T22A066) to form a mixture of polybutadiene resin. Then, 6.5 g of the above mixture of polybutadiene resin was added to 50 g of the above polyimide resin solution and 2.5 g of the above surface modified SiO$_2$ to form a mixture of resin composition A2.

(4) Preparation of Cured Product of Resin Composition A2

A three-wheel roller (400 rpm) was used to uniformly disperse the above mixture of resin composition A2, and then the mixture was subjected to a vacuum defoaming process. Then, the mixture of resin composition A2 was coated on a copper foil and dried at 140° C. for 6 minutes to carry out the curing process. Then, the mixture of resin composition A2 was heated at 380° C. for 10 minutes to carry out a cyclization (imidation) process. Then, the copper foil was removed to obtain a cured film of the resin composition A2, and the thickness of the cured film was measured.

Example 3: Resin Composition A3

(1) Surface Modification of Silica ($SiO_2$)

20 g of $SiO_2$ (the volume mean diameter is 2-3 μm) and 0.2 g of vinyltriethoxysilane (which was bought from Shin-Etsu, catalogue number KBE-1003) were dispersed in 10 g of water (pH=3.5), and were stirred for 20 minutes and dried at 120° C.

(2) Preparation of Polyimide Resin Solution (Precursor of Polyimide Resin)

24.20 g (0.076 moles) of 2,2'-bis(trifluoromethyl)benzidine (TFMB), 1.85 g (0.017 moles) of p-phenylenediamine (PDA), 2.36 g (0.008 moles) of 1,3-bis(4-aminophenoxy)benzene (TPE-R) and 244.37 g of N-methyl-2-pyrrolidone (NMP) were placed in a three-necked bottle. After complete dissolution with stirring at 30° C., 41.75 g (0.091 moles) of p-phenylenebis(trimellitate anhydride) (TAHQ) and 2.83 g (0.005 moles) of 4,4'-(4,4'-isopropyldiphenoxy)bis(phthalic anhydride) (PBADA) were added to the above mixture. Then, the mixture was stirred continuously and reacted at 25° C. for 24 hours to obtain the polyimide resin solution.

(3) Preparation of Mixture of Resin Composition A3

25 g of butanone was added to 10 g of polybutadiene (the number-average molecular weight=8600) (which was bought from Cray Valley, Inc., catalogue number Ricon 134) and 2.2 g of tetramethyltetravinylcyclotetrasiloxane (which was bought from Alfa Aesar, catalogue number T22A066) to form a mixture of polybutadiene resin. Then, 6.5 g of the above mixture of polybutadiene resin was added to 50 g of the above polyimide resin solution and 2.5 g of the above surface modified $SiO_2$ to form a mixture of resin composition A3.

(4) Preparation of Cured Product of Resin Composition A3

A three-wheel roller (400 rpm) was used to uniformly disperse the above mixture of resin composition A3, and then the mixture was subjected to a vacuum defoaming process. Then, the mixture of resin composition A3 was coated on a copper foil and dried at 140° C. for 6 minutes to carry out the curing process. Then, the mixture of resin composition A3 was heated at 380° C. for 10 minutes to carry out a cyclization (imidation) process. Then, the copper foil was removed to obtain a cured film of the resin composition A3, and the thickness of the cured film was measured.

Example 4: Resin Composition A4

(1) Surface Modification of Silica ($SiO_2$)

20 g of $SiO_2$ (the volume mean diameter is 2-3 μm) and 0.2 g of vinyltriethoxysilane (which was bought from Shin-Etsu, catalogue number KBE-1003) were dispersed in 10 g of water (pH=3.5), and were stirred for 20 minutes and dried at 120° C.

(2) Preparation of Polyimide Resin Solution (Precursor of Polyimide Resin)

24.20 g (0.076 moles) of 2,2'-bis(trifluoromethyl)benzidine (TFMB), 1.85 g (0.017 moles) of p-phenylenediamine (PDA), 2.36 g (0.008 moles) of 1,3-bis(4-aminophenoxy)benzene (TPE-R) and 244.37 g of N-methyl-2-pyrrolidone (NMP) were placed in a three-necked bottle. After complete dissolution with stirring at 30° C., 41.75 g (0.091 moles) of p-phenylenebis(trimellitate anhydride) (TAHQ) and 2.83 g (0.005 moles) of 4,4'-(4,4'-isopropyldiphenoxy)bis(phthalic anhydride) (PBADA) were added to the above mixture. Then, the mixture was stirred continuously and reacted at 25° C. for 24 hours to obtain the polyimide resin solution.

(3) Preparation of Mixture of Resin Composition A4

25 g of butanone was added to 10 g of polybutadiene (the number-average molecular weight=1500) (which was bought from Polysciences, Inc., catalogue number 22395) and 2.2 g of tetramethyltetravinylcyclotetrasiloxane (which was bought from Alfa Aesar, catalogue number T22A066) to form a mixture of polybutadiene resin. Then, 0.7 g of the above mixture of polybutadiene resin was added to 50 g of the above polyimide resin solution and 2.5 g of the above surface modified $SiO_2$ to form a mixture of resin composition A4.

(4) Preparation of Cured Product of Resin Composition A4

A three-wheel roller (400 rpm) was used to uniformly disperse the above mixture of resin composition A4, and then the mixture was subjected to a vacuum defoaming process. Then, the mixture of resin composition A4 was coated on a copper foil and dried at 140° C. for 6 minutes to carry out the curing process. Then, the mixture of resin composition A4 was heated at 380° C. for 10 minutes to carry out a cyclization (imidation) process. Then, the copper foil was removed to obtain a cured film of the resin composition A3, and the thickness of the cured film was measured.

Comparative Example 1: Resin Composition C1

The process was substantially the same as in Example 1, except polybutadiene resin and $SiO_2$ were not added.

Comparative Example 2: Resin Composition C2

The process was substantially the same as in Example 1, except $SiO_2$ was not added. The process is described in detail below.

(1) Preparation of Mixture of Resin Composition C2

25 g of butanone was added to 10 g of polybutadiene (the number-average molecular weight=1500) (which was bought from Polysciences, Inc., catalogue number 480843) and 2.2 g of tetramethyltetravinylcyclotetrasiloxane (which was bought from Alfa Aesar, catalogue number T22A066) to form a mixture of polybutadiene resin. Then, 3.2 g of the above mixture of polybutadiene resin was added to 50 g of the above polyimide resin solution to form a mixture of resin composition C2.

(2) Preparation of Cured Product of Resin Composition C2

A three-wheel roller (400 rpm) was used to uniformly disperse the above mixture of resin composition C2, and then the mixture was subjected to a vacuum defoaming process. Then, the mixture of resin composition C2 was coated on a copper foil and dried at 140° C. for 6 minutes to carry out the curing process. Then, the mixture of resin composition C2 was heated at 380° C. for 10 minutes to carry out a cyclization (imidation) process. Then, the copper foil was removed to obtain a cured film of the resin composition C2, and the thickness of the cured film was measured.

Comparative Example 3: Resin Composition C3

The process was substantially the same as in Comparative Example 2, except 6.2 g of the mixture of polybutadiene resin and 50 g of the polyimide resin solution were added.

Comparative Example 4: Resin Composition C4

The process was substantially the same as in Comparative Example 2, except 9.5 g of the mixture of polybutadiene resin and 50 g of the polyimide resin solution were added.

Comparative Example 5: Resin Composition C5

The process was substantially the same as in Comparative Example 2, except 12.5 g of the mixture of polybutadiene resin and 50 g of the polyimide resin solution were added.

Comparative Example 6: Resin Composition C6

The process was substantially the same as in Comparative Example 2, except 16.65 g of the mixture of polybutadiene resin and 50 g of the polyimide resin solution were added.

Comparative Example 7: Resin Composition C7

The process was substantially the same as in Comparative Example 2, except 50 g of the mixture of polybutadiene resin and 50 g of the polyimide resin solution were added.

Comparative Example 8: Resin Composition C8

The process was substantially the same as in Comparative Example 2, except the number-average molecular weight of the polybutadiene (which was bought from Polysciences, Inc., catalogue number 480843) was 3000, and 6.2 g of the mixture of polybutadiene resin and 50 g of the polyimide resin solution were added.

Measurement of Coefficient of Thermal Expansion (CTE)

TMA (Thermal Mechanical Analyzer) was used to measure the coefficient of thermal expansion. Specifically, the sample was placed in a heating furnace that can be programmed to heat, cool or maintain a constant temperature. A constant ambient gas (e.g., nitrogen) was introduced into the heating furnace. Then, a force of 30 mN was applied to the sample, and the changes of expansion or contraction of sample during heating or cooling were recorded. The linear coefficient of thermal expansion of the resin compositions A1-A4 prepared in Examples 1-4 and the resin compositions C1-C8 prepared in Comparative Examples 1-8 were measured by the method described above.

Measurement of Water Absorption Rate

A sample having an area of 10 cm×10 cm was dried for 1 hour in the oven at a temperature ranging from 105° C. to 110° C., then the sample was weighed ($W_1$). The sample was then soaked in distilled water (23° C.) for 24 hours. Then, the soaked sample was taken out, placed between absorbent papers, and rolled in a roller three or four times until there was no obvious water absorption on the surfaces of the absorbent papers. The sample was then weighed again ($W_2$). The water absorption rate was obtained by the formula: water absorption rate=$(W_2-W_1)/W_1 \times 100\%$, $W_1$=the weight before soak, $W_2$=the weight after soak. The water absorption rates of the resin compositions A1-A4 prepared in Examples 1-4 and the resin compositions C1-C8 prepared in Comparative Examples 1-8 were measured by the method described above.

The results of the analysis of the properties of the resin compositions prepared in the above Examples 1-4 and Comparative Examples 1-8 are summarized in Table 1.

TABLE 1

| resin composition | polyimide resin (parts by weight) | hydrocarbon resin (parts by weight) | Mn | SiO$_2$ (parts by weight) | thickness (mm) | Df @10 GHz | Df @38 GHz | CTE (ppm/K) | water absorption rate (%) |
|---|---|---|---|---|---|---|---|---|---|
| A1 | 100 | 13.0 | 1500 | 5.0 | 0.029 | 0.0043 | 0.0029 | 34.2 | <1 |
| A2 | 100 | 13.0 | 3000 | 5.0 | 0.034 | 0.0054 | 0.0045 | 31 | <1 |
| A3 | 100 | 13.0 | 8600 | 5.0 | 0.034 | 0.0051 | 0.0054 | 32 | <1 |
| A4 | 100 | 1.4 | 1500 | 5.0 | 0.042 | 0.0038 | * | 37 | <1 |
| C1 | 100 | 0 | — | 0 | 0.024 | 0.0035 | 0.0052 | 20 | 1.5-2.5 |
| C2 | 100 | 6.4 | 1500 | 0 | 0.026 | 0.0053 | 0.0038 | 31.3 | <1 |
| C3 | 100 | 12.4 | 1500 | 0 | 0.029 | 0.0042 | 0.0035 | 28.1 | <1 |
| C4 | 100 | 19.0 | 1500 | 0 | 0.052 | 0.0044 | 0.0064 | 32 | <1 |
| C5 | 100 | 25 | 1500 | 0 | 0.055 | 0.0039 | 0.0061 | 35 | <1 |
| C6 | 100 | 33.3 | 1500 | 0 | 0.058 | 0.0043 | 0.0056 | 37 | <1 |
| C7 | 100 | 100 | 1500 | 0 | 0.032 | 0.0044 | 0.0078 | 57.9 | <1 |
| C8 | 100 | 12.4 | 3000 | 0 | 0.024 | 0.0062 | 0.006 | 30.6 | <1 |

* the data is under measurement

Measurement of Dielectric Loss Factor (Df)

Split-post Dielectric Resonator (SPDR), which can be obtained from Genie Networks, was used to measure the dielectric loss factor. Specifically, the materials having low dielectric loss factor under high-frequency conditions (PTFE test piece) were used to form a resonance structure. The sample was placed between the two materials so that the resonance signal was interfered with, and the dielectric properties of the sample were obtained by inversion calculation. The dielectric loss factors of the resin compositions A1-A4 prepared in Examples 1-4 and the resin compositions C1-C8 prepared in Comparative Examples 1-8 were measured by the method described above. The dielectric loss factors under conditions of 10 GHz and 38 GHz (Df@10 GHz and Df@38 GHz) were measured.

It can be observed from the results in Table 1 that the addition of the hydrocarbon resin can reduce or maintain the dielectric loss factor of the resin composition in the high-frequency section (about 30 GHz to about 40 GHz). The dielectric loss factor of the resin composition does not rapidly increase in a high-frequency environment, and therefore can effectively reduce the loss of signal transmission.

In addition, the resin composition provided in the embodiments may have a water absorption rate of less than about 1%, and the linear coefficient of thermal expansion may be maintained below 35 ppm/K. On the other hand, hydrocarbon resins having the number-average molecular weight within a specific range have the effect of lowering the dielectric loss factor.

Example 5: Resin Composition B1

(1) Surface Modification of Silica ($SiO_2$)

20 g of $SiO_2$ (the volume mean diameter is 2-3 μm) and 0.2 g of vinyltriethoxysilane (which was bought from Shin-Etsu, catalogue number KBE-1003) were dispersed in 10 g of water (pH=3.5), and were stirred for 20 minutes and dried at 120° C.

(2) Preparation of Polyimide Resin Solution (Precursor of Polyimide Resin)

24.20 g (0.076 moles) of 2,2'-bis(trifluoromethyl)benzidine (TFMB), 1.85 g (0.017 moles) of p-phenylenediamine (PDA), 2.36 g (0.008 moles) of 1,3-bis(4-aminophenoxy)benzene (TPE-R) and 244.37 g of N-methyl-2-pyrrolidone (NMP) were placed in a three-necked bottle. After complete dissolution with stirring at 30° C., 41.75 g (0.091 moles) of p-phenylenebis(trimellitate anhydride) (TAHQ) and 2.83 g (0.005 moles) of 4,4'-(4,4'-isopropyldiphenoxy)bis(phthalic anhydride) (PBADA) were added to the above mixture. Then, the mixture was stirred continuously and reacted at 25° C. for 24 hours to obtain the polyimide resin solution.

(3) Preparation of Mixture of Resin Composition B1

A few of 1,2-dimethoxyethane (DME) was added to 1.6 g of PTFE resins (the volume mean diameter is 3-4 μm) (which were bought from DAIKIN, catalogue number L-5F) to swell the PTFE resins. Then, 50 g of polyimide resin solution, 20 g of 1,2-dimethoxyethane and 1.85 g of the above surface modified $SiO_2$ were added to the swelled PTFE resins to form a mixture of resin composition B1.

(4) Preparation of Cured Product of Resin Composition B1

A three-wheel roller (400 rpm) was used to uniformly disperse the above mixture of resin composition B1, and then the mixture was subjected to a vacuum defoaming process. Then, the mixture of resin composition B1 was coated on a copper foil and dried at 140° C. for 6 minutes to carry out the curing process. Then, the mixture of resin composition B1 was heated at 380° C. for 10 minutes to carry out a cyclization (imidation) process. Then, the copper foil was removed to obtain a cured film of the resin composition B1, and the thickness of the cured film was measured.

Example 6: Resin Composition B2

The process was substantially the same as in Example 4, except 3.3 g of the PTFE resin (the volume mean diameter is 3-4 μm) (which were bought from DAIKIN, catalogue number L-5F), 1.95 g of surface modified $SiO_2$, and 50 g of the polyimide resin solution were added.

Example 7: Resin Composition B3

The process was substantially the same as in Example 4, except 6 g of the PTFE resin (the volume mean diameter is 3-4 μm) (which were bought from DAIKIN, catalogue number L-5F), 2.0 g of surface modified $SiO_2$, and 50 g of the polyimide resin solution were added.

Example 8: Resin Composition B4

The process was substantially the same as in Example 4, except 9.2 g of the PTFE resin (the volume mean diameter is 3-4 μm) (which were bought from DAIKIN, catalogue number L-5F), 2.15 g of $SiO_2$, and 50 g of the polyimide resin solution were added.

Example 9: Resin Composition B5

The process was substantially the same as in Example 4, except 13.05 g of the PTFE resin (the volume mean diameter is 3-4 μm) (which were bought from DAIKIN, catalogue number L-5F), 2.3 g of $SiO_2$, and 50 g of the polyimide resin solution were added.

Example 10: Resin Composition B6

(1) Surface Modification of Silica ($SiO_2$)

20 g of $SiO_2$ (the volume mean diameter is 0.5 μm) and 0.2 g of vinyltriethoxysilane (which was bought from Shin-Etsu, catalogue number KBE-1003) were dispersed in 10 g of water (pH=3.5), and were stirred for 20 minutes and dried at 120° C.

(2) Preparation of Polyimide Resin Solution (Precursor of Polyimide Resin)

24.20 g (0.076 moles) of 2,2'-bis(trifluoromethyl)benzidine (TFMB), 1.85 g (0.017 moles) of p-phenylenediamine (PDA), 2.36 g (0.008 moles) of 1,3-bis(4-aminophenoxy)benzene (TPE-R) and 244.37 g of N-methyl-2-pyrrolidone (NMP) were placed in a three-necked bottle. After complete dissolution with stirring at 30° C., 41.75 g (0.091 moles) of p-phenylenebis(trimellitate anhydride) (TAHQ) and 2.83 g (0.005 moles) of 4,4'-(4,4'-isopropyldiphenoxy)bis(phthalic anhydride) (PBADA) were added to the above mixture. Then, the mixture was stirred continuously and reacted at 25° C. for 24 hours to obtain the polyimide resin solution.

(3) Preparation of Mixture of Resin Composition B6

A few of 1,2-dimethoxyethane (DME) was added to 17.5 g of PTFE resins (3-4 μm) (which were bought from DAIKIN, catalogue number L-5F) to swell the PTFE resins. Then, 50 g of polyimide resin solution, 20 g of 1,2-dimethoxyethane and 2.45 g of the above surface modified $SiO_2$ were added to the swelled PTFE resins to form a mixture of resin composition B6.

(4) Preparation of Cured Product of Resin Composition B6

A three-wheel roller (400 rpm) was used to uniformly disperse the above mixture of resin composition B6, and then the mixture was subjected to a vacuum defoaming process. Then, the mixture of resin composition B6 was coated on a copper foil and dried at 140° C. for 6 minutes to carry out the curing process. Then, the mixture of resin composition B6 was heated at 380° C. for 10 minutes to carry out a cyclization (imidation) process. Then, the copper foil was removed to obtain a cured film of the resin composition B6, and the thickness of the cured film was measured.

Example 11: Resin Composition B7

The process was substantially the same as in Example 9, except the volume mean diameter of $SiO_2$ is 3 μm.

Example 12: Resin Composition B8

The process was substantially the same as in Example 9, except the volume mean diameter of $SiO_2$ is 11 μm.

Example 13: Resin Composition B9

The process was substantially the same as in Example 9, except the volume mean diameter of $SiO_2$ is 25 μm.

Comparative Example 9: Resin Composition C9

The process was substantially the same as in Example 4, except the PTFE resins and $SiO_2$ were not added.

Comparative Example 10: Resin Composition C10

The process was substantially the same as in Example 4, except $SiO_2$ was not added. The process is described in detail below.

(1) Preparation of Mixture of Resin Composition C10

A few of 1,2-dimethoxyethane (DME) was added to 16.5 g of PTFE resins (the volume mean diameter is 3-4 μm) (which were bought from DAIKIN, catalogue number L-5F) to swell the PTFE resins. Then, 50 g of polyimide resin solution and 20 g of 1,2-dimethoxyethane were added to the swelled PTFE resins to form a mixture of resin composition C10.

(2) Preparation of Cured Product of Resin Composition C10

A three-wheel roller (400 rpm) was used to uniformly disperse the above mixture of resin composition C10, and then the mixture was subjected to a vacuum defoaming process. Then, the mixture of resin composition C10 was coated on a copper foil and dried at 140° C. for 6 minutes to carry out the curing process. Then, the mixture of resin composition C10 was heated at 380° C. for 10 minutes to carry out a cyclization (imidation) process. Then, the copper foil was removed to obtain a cured film of the resin composition C10, and the thickness of the cured film was measured.

The dielectric loss factors under conditions of 10 GHz and 38 GHz, the linear coefficient of thermal expansion and the water absorption rate of the resin compositions B1-B7 prepared in Examples 5-13 and the resin compositions C9-C10 prepared in Comparative Examples 9-10 were measured. The method for measurement of the dielectric loss factor, linear coefficient of thermal expansion and water absorption rate were the same as described above.

The results of the analysis of the properties of the resin compositions prepared in the above Examples 5-13 and Comparative Examples 9-10 are summarized in Table 2.

To summarize the above, in accordance with some embodiments of the present disclosure, the resin composition including polyimide resins and fluorinated polymer resins or hydrocarbon resins is provided. The fluorinated polymer resin and the hydrocarbon resin are added so that the resin composition can still maintain good dielectric properties in a high-frequency environment and the loss of signal transmission can be effectively decreased. Therefore, when the elements made of such resin composition (e.g., a substrate, a printed circuit board, or the like) are applied to a signal transmission device, the rate of high-frequency transmission and the integrity of the transmission signal of the device can be improved.

Although some embodiments of the present disclosure and their advantages have been described in detail, it should be understood that various changes, substitutions and alterations can be made herein without departing from the spirit and scope of the disclosure as defined by the appended claims. For example, it will be readily understood by one of ordinary skill in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A resin composition, comprising:
    a polyimide resin;
    a hydrocarbon resin; and
    a silica that is modified by a surface modifier,

TABLE 2

| resin composition | polyimide resin (parts by weight) | fluorinated polymer resin (parts by weight) | $SiO_2$ (parts by weight) | $SiO_2$ particle size (μm) | thickness (mm) | Df @10 GHz | Df @38 GHz | CTE (ppm/K) | water absorption rate (%) |
|---|---|---|---|---|---|---|---|---|---|
| B1 | 100 | 3.2 | 3.7 | 3 | 0.029 | 0.0038 | 0.0055 | 30 | 0.84 |
| B2 | 100 | 6.6 | 3.9 | 3 | 0.0315 | 0.0043 | 0.0043 | 29 | 0.76 |
| B3 | 100 | 12 | 4.0 | 3 | 0.0315 | 0.0034 | 0.0049 | 32 | 0.63 |
| B4 | 100 | 18.4 | 4.3 | 3 | 0.035 | 0.0040 | 0.0044 | 37 | 0.52 |
| B5 | 100 | 26.1 | 4.6 | 3 | 0.0365 | 0.0036 | 0.0046 | 40 | 0.81 |
| B6 | 100 | 35 | 4.9 | 0.5 | 0.0435 | 0.0034 | 0.0037 | 39.9 | 0.46 |
| B7 | 100 | 35 | 4.9 | 3 | 0.043 | 0.0035 | 0.0024 | 45.2 | 0.48 |
| B8 | 100 | 35 | 4.9 | 11 | 0.038 | 0.0034 | 0.0045 | 38 | 0.29 |
| B9 | 100 | 35 | 4.9 | 25 | 0.041 | 0.0038 | 0.0051 | 37 | 0.77 |
| C9 | 100 | 0 | 0 | — | 0.027 | 0.0035 | 0.0052 | 20 | 1.5-2.5 |
| C10 | 100 | 33 | 0 | — | 0.0365 | 0.0037 | 0.0043 | 41 | 0.6 |

It can be observed from the results in Table 2 that the addition of the fluorinated polymer resin can reduce or maintain the dielectric loss factor of the resin composition in the high-frequency section. The dielectric loss factor of the resin composition does not rapidly increase in a high-frequency environment, and therefore can effectively reduce the loss of signal transmission.

wherein the content of the hydrocarbon resin is in a range from 1 to 13 parts by weight based on 100 parts by weight of the polyimide resin, and the content of the silica is in a range from 1 to 10 parts by weight based on 100 parts by weight of the polyimide resin, and wherein the polyimide resin is copolymerized by the following components:

(a) at least two dianhydride monomers, one of the dianhydride monomers is p-phenylenebis(trimellitate anhydride) and its content accounts for 80-95% of the total moles of the dianhydride monomers; and the other dianhydride monomers are selected from a group consisting of 4,4'-(hexafluoroisopropylidene)-diphthalic anhydride, and 4,4'-(4,4'-isopropyldiphenoxy)bis(phthalic anhydride); and (b) at least two diamine monomers, wherein one of the diamine monomers is 2,2'-bis(trifluoromethyl)benzidine and its content accounts for 70% to 90% of total moles of the diamine monomers; and the other diamine monomers are selected from a group consisting of 4,4'-diaminodiphenyl ether, 4,4'-diaminodiphenyl-methane, 2,2-bis[4-(4-aminophenoxy)phenyl]propane, 4,4'-diaminodiphenyl-sulfone, 1,3-bis(4-aminophenoxy)benzene, 4,4'-diaminobenzanilide, p-phenylenediamine, 4,4'-diamino-2,2'-dimethyl-1,1'-biphenyl, 2,2-bis[4-(4-aminophenoxy)phenyl]-1,1,1,3,3,3-hexafluoropropane, and 4,4'-diamino octafluorobiphenyl, 2,2-bis(3-amino-4-tolyl)hexafluoropropane, and 2,2-bis(3-amino-4-hydroxyphenyl)hexafluoropropane, and its content accounts for 10% to 30% of the total moles of the diamine monomers;

wherein a ratio of the total moles of the dianhydride monomers to the total moles of the diamine monomers is in a range from 0.85 to 1.15.

2. The resin composition as claimed in claim 1, wherein the other dianhydride monomers comprise 4,4'-(hexafluoroisopropylidene)bis-phthalic anhydride and its content accounts for not more than 15% of the total moles of the dianhydride monomers.

3. The resin composition as claimed in claim 1, wherein the surface modifier comprises vinyltriethoxysilane, propyltrimethoxysilane, propyltriethoxysilane, isobutyltrimethoxysilane, isobutyltriethoxysilane, octyltrimethoxysilane, octyltriethoxysilane, octadecyltrimethoxysilane, octadecylethoxysilane, N-phenyl-3-aminopropyltrimethoxysilane, phenyltrimethoxysilane, phenyltriethoxysilane, 3-glycidoxypropyltrimethoxysilane, 3-glycidoxypropyltriethoxysilane, 3-aminopropyltrimethoxysilane, 3-aminopropyltriethoxysilane, aminoethyl aminopropyl trimethoxysilane, aminoethyl aminopropyl triethoxysilane, 3-isocyanatopropyltrimethoxysilane, 3-isocyanatopropyltriethoxysilane, or a combination thereof.

4. The resin composition as claimed in claim 1, wherein a volume mean diameter of the silica is in a range from 0.5 μm to 25 μm.

5. The resin composition as claimed in claim 1, wherein the content of the surface modifier is in a range from 0.1 to 5 parts by weight based on 100 parts by weight of the silica.

6. The resin composition as claimed in claim 1, wherein the hydrocarbon resin comprises polybutadiene, polybutadiene-styrene mixture, polyisoprene, cyclic olefin copolymer, butadiene-styrene-divinylbenzene copolymer, or a combination thereof.

\* \* \* \* \*